(12) United States Patent  (10) Patent No.: US 7,918,694 B1
Stahl et al.  (45) Date of Patent: Apr. 5, 2011

(54) CONNECTOR ASSEMBLY FOR SOLAR SHINGLES

(75) Inventors: Daniel Eugene Stahl, Middletown, PA (US); Robert Scott Good, Camp Hill, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/715,186

(22) Filed: Mar. 1, 2010

(51) Int. Cl.
*H01R 13/33* (2006.01)
(52) U.S. Cl. ......................................... 439/840
(58) Field of Classification Search ................. 439/840, 439/850, 750, 65; 136/244, 25
See application file for complete search history.

(56) References Cited

U.S. PATENT DOCUMENTS

| | | | | |
|---|---|---|---|---|
| 4,763,641 | A * | 8/1988 | Smith | 126/672 |
| 5,437,735 | A | 8/1995 | Younan et al. | |
| 6,414,237 | B1 | 7/2002 | Boer | |
| 6,786,012 | B2 | 9/2004 | Bradley | |
| 7,318,758 | B2 * | 1/2008 | Haller | 439/843 |
| 7,587,864 | B2 | 9/2009 | McCaskill et al. | |
| 7,678,990 | B2 * | 3/2010 | McCaskill et al. | 136/244 |
| 7,678,991 | B2 * | 3/2010 | McCaskill et al. | 136/244 |
| 2003/0154667 | A1 | 8/2003 | Dinwoodie | |
| 2005/0081909 | A1 * | 4/2005 | Paull | 136/246 |
| 2005/0102947 | A1 * | 5/2005 | McCaskill et al. | 52/518 |
| 2005/0178429 | A1 | 8/2005 | McCaskill et al. | |
| 2005/0178430 | A1 * | 8/2005 | McCaskill et al. | 136/251 |
| 2007/0175153 | A1 | 8/2007 | O'Hara et al. | |
| 2007/0251571 | A1 | 11/2007 | Jacobs et al. | |
| 2008/0107015 | A1 | 5/2008 | Cho et al. | |
| 2008/0302030 | A1 | 12/2008 | Stancel et al. | |
| 2008/0302409 | A1 | 12/2008 | Bressler et al. | |
| 2009/0056792 | A1 | 3/2009 | Salyer | |
| 2009/0293863 | A1 * | 12/2009 | Augenbraun et al. | 126/623 |
| 2009/0293864 | A1 | 12/2009 | Augenbraun et al. | |
| 2009/0293932 | A1 * | 12/2009 | Augenbraun et al. | 136/244 |
| 2009/0320405 | A1 * | 12/2009 | McCaskill et al. | 52/745.06 |
| 2010/0101561 | A1 * | 4/2010 | Frank et al. | 126/622 |
| 2010/0101634 | A1 * | 4/2010 | Frank et al. | 136/251 |
| 2010/0105245 | A1 * | 4/2010 | Good et al. | 439/571 |
| 2010/0116264 | A1 * | 5/2010 | Heuschkel | 126/622 |
| 2010/0223864 | A1 * | 9/2010 | Dube | 52/173.3 |

FOREIGN PATENT DOCUMENTS

WO  WO 2008/107015  9/2008

* cited by examiner

*Primary Examiner* — T C Patel
*Assistant Examiner* — Vladimir Imas

(57) ABSTRACT

A connector assembly for electrically coupling solar shingles is provided. The solar shingles include photovoltaic sections that convert light into electricity and supporting sections having upper surfaces to which additional solar shingles are mounted. The connector assembly includes a contact and a protective cover. The contact electrically couples the photovoltaic sections of adjacent solar shingles by engaging conductive members disposed in recesses of the supporting sections of the solar shingles. The protective cover is disposed in the recesses of the solar shingles. The protective cover encloses the contact between the protective cover and the conductive members.

20 Claims, 8 Drawing Sheets

CONNECTOR ASSEMBLY FOR SOLAR SHINGLES

BACKGROUND OF THE INVENTION

The subject matter herein relates generally to connector assemblies, and more particularly, to connector assemblies that electrically couple solar shingles.

Increasing demand for renewable energy has resulted in increasing demand for photovoltaic modules. Photovoltaic modules convert incident light into electricity, such as voltage or current, that may be used to power one or more electric loads. Previously, some photovoltaic modules have been mounted to the roofs or upper surfaces of structures, such as commercial buildings and dwellings. These photovoltaic modules have been relatively large and heavy, and were mounted to the structures with considerable effort and expense.

Roofing shingles recently have been developed that incorporate photovoltaic cells or modules. The shingles may be referred to as solar shingles. The shingles are mounted to the roofs or upper surfaces of structures. The photovoltaic cells or modules in the shingles receive incident light and convert the light to electricity. The shingles tend to be significantly smaller and easier to install than previous photovoltaic modules. For example, the shingles tend to be much thinner than the previous photovoltaic structures.

In order to increase the amount of electricity drawn from the solar shingles, the solar shingles may need to be electrically joined in series or parallel. The voltage or current generated by the solar shingles connected in series or parallel may be additive. For example, as more solar shingles are connected in series or parallel, a greater amount of electricity may be drawn therefrom.

Electrically coupling solar shingles has proven to be problematic. In some known solar shingles, wires and other cables are used to electrically couple the shingles. These wires and cables may be exposed above the shingles that the wires and cables connect. This location of the wires and cables can be unsightly, thereby resulting in fewer homeowners wanting the solar shingles on their homes. The location of the wires and cables also may be problematic for the stacking or staggering of shingles on roofs and structures. For example, shingles typically overly one another to prevent water from reaching the building below the shingles. The wires and cables may prevent the shingles from being laid over one another in such a manner to prevent water from seeping between the shingles and to the building below.

Therefore, a need exists for an electric coupling between solar shingles that avoids the drawbacks of using wires or cables disposed above the shingles to couple the shingles.

BRIEF DESCRIPTION OF THE INVENTION

In one embodiment, a connector assembly for electrically coupling solar shingles is provided. The solar shingles include photovoltaic sections that convert light into electricity and supporting sections having upper surfaces to which additional solar shingles are mounted. The connector assembly includes a contact and a protective cover. The contact electrically couples the photovoltaic sections of adjacent solar shingles by engaging conductive members disposed in recesses of the supporting sections of the solar shingles. The protective cover is disposed in the recesses of the solar shingles. The protective cover encloses the contact between the protective cover and the conductive members.

In another embodiment, another connector assembly is provided. The connector assembly electrically couples solar shingles that convert light into electricity. The solar shingles have recesses extending inward from upper surfaces to lower surfaces and disposed along outer edges of the solar shingles with conductive members disposed in the recesses. The connector assembly includes a contact and a protective cover. The contact is disposed in the recesses such that the contact overlaps an interface between the outer edges of the solar shingles and engages the conductive members to electrically couple the solar shingles. The protective member is mounted to the solar shingles in the recesses. The protective cover encloses the contact between the protective cover and the conductive members.

In another embodiment, a connector assembly for electrically coupling photovoltaic sections of adjacent lower solar shingles with a photovoltaic section of an upper solar shingle is provided. The connector assembly includes a lower contact, an upper contact, and a protective cover. The lower contact electrically couples the photovoltaic sections of the lower solar shingles by engaging conductive members of the lower solar shingles. The upper contact engages a conductive member of the upper solar shingle. The protective cover is disposed between the lower contact and the upper contact and includes an opening through which the lower contact and the upper contact are electrically joined with each other. The lower contact and the upper contact simultaneously couple the photovoltaic sections of the lower solar shingles with the photovoltaic section of the upper solar shingle.

DETAILED DESCRIPTION OF THE INVENTION

Figure 1:
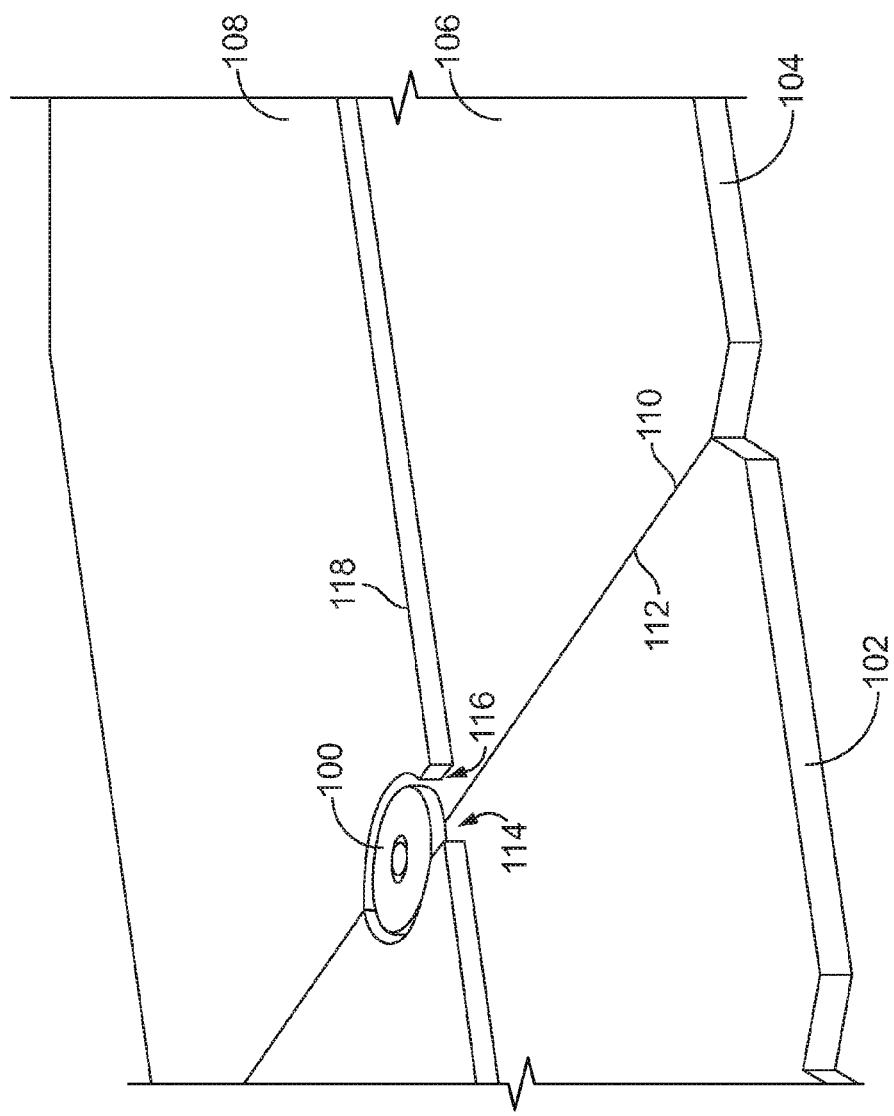
FIG. 1 is a perspective view of a connector assembly for electrically coupling adjacent solar shingles in accordance with one embodiment of the present disclosure.

FIG. 1 is a perspective view of a connector assembly 100 for electrically coupling adjacent solar shingles 102, 104 in accordance with one embodiment of the present disclosure. The solar shingles 102, 104 may be roof shingles that convert incident light into electricity. The solar shingles 102, 104 include photovoltaic sections 106 and supporting sections 108. The photovoltaic sections 106 include solar cells or solar modules that convert incident light into electricity. The photovoltaic sections 106 remain exposed to light in order to convert the light into electricity. The supporting sections 108 are joined with the photovoltaic sections 106. The supporting sections 108 provide a surface upon which additional solar shingles 102, 104 may be mounted. For example, additional adjacent solar shingles that are similar to the solar shingles 102, 104 may be mounted to the supporting sections 108 of the solar shingles 102, 104 shown in FIG. 1. The additional solar shingles are mounted to the illustrated solar shingles 102, 104 such that the photovoltaic sections 106 of the illustrated solar shingles 102, 104 remain exposed and able to receive light.

The solar shingles 102, 104 abut one another along outer edges 110, 112 of the solar shingles 102, 104. Alternatively, a gap may exist between the outer edges 110, 112. In the illustrated embodiment, the supporting sections 108 include recesses 114, 116 that extend into the supporting sections 108 along portions of the respective edges 110, 112. The recesses 114, 116 form an approximately circular well when the solar shingles 102, 104 abut one another. Alternatively, the recesses 114, 116 may form a well or pocket of another shape. The solar shingles 102, 104 include conductive members 302, 304 (shown in FIG. 3) disposed in the recesses 114, 116. The conductive members 302, 304 are electrically joined with the photovoltaic sections 106. The connector assembly 100 engages the conductive members 302, 304 to electrically couple the solar shingles 102, 104. For example, the connector assembly 100 may extend over or overlap the interface between the outer edges 110, 112 of the solar shingles 102, 104 in order to engage the conductive member 302, 304 of each solar shingle 102, 104. The interface may represent a direct engagement between two solar shingles 102, 104 abutted against one another or may include a gap between two adjacent solar shingles 102, 104. The connector assembly 100 may serially couple the photovoltaic sections 106 of the solar shingles 102, 104 in order to increase the electricity that is output by the solar shingles 102, 104.

The supporting sections 108 of the solar shingles 102, 104 have an upper surface 118 upon which additional solar shingles may be mounted. For example, one or more additional solar shingles that are similar to the solar shingles 102, 104 may be mounted on the supporting sections 108 while not blocking or obscuring the photovoltaic sections 106 from receiving light. In the illustrated embodiment, the connector assembly 100 is confined to the well or pocket formed by the recesses 114, 116. For example, the connector assembly 100 may not extend outside of the recesses 114, 116 and may not protrude above the supporting sections 108 of the solar shingles 102, 104. Because the connector assembly 100 does not extend above the upper surface 118 of the supporting sections 108, the additional solar shingles 102, 104 may be mounted to the supporting sections 108 of the solar shingles 102, 104 above the connector assembly 100. In one embodiment, the connector assembly 100 may be enclosed within the recesses 114, 116 and covered by the additional solar shingles that are mounted to the supporting sections 108. As described below, the low profile of the connector assembly 100 allows the additional solar shingles to be mounted directly above the connector assembly 100 on the supporting sections 108.

Figure 2:
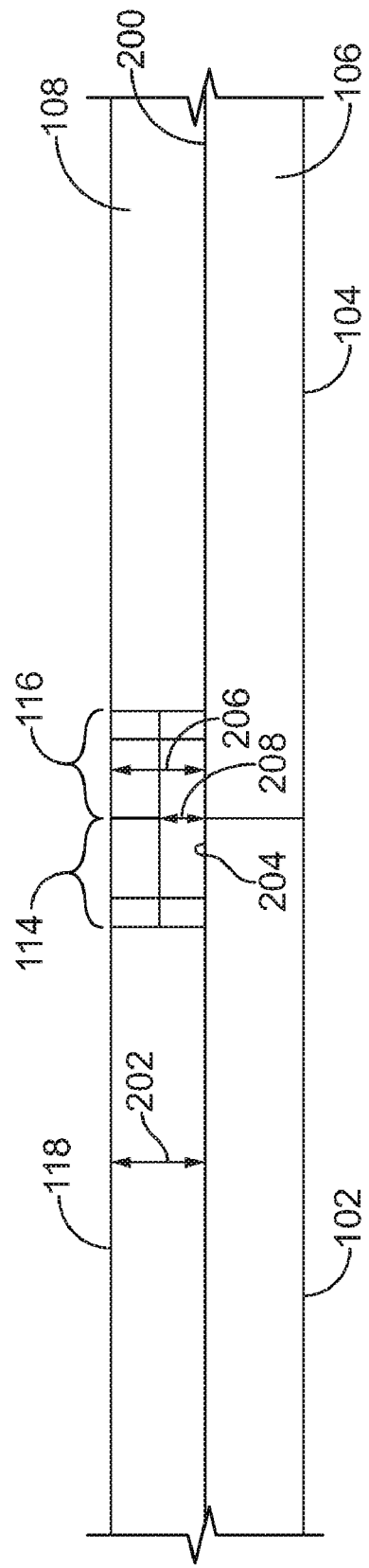
FIG. 2 is an elevational view of the connector assembly shown in FIG. 1 in accordance with one embodiment of the present disclosure.

FIG. 2 is an elevational view of the connector assembly 100 mounted to the solar shingles 102, 104 in accordance with one embodiment of the present disclosure. The supporting sections 108 of the solar shingles 102, 104 extend above upper light receiving surfaces 200 of the photovoltaic sections 106. The light receiving surfaces 200 shown in FIG. 2 are the upper surfaces of the photovoltaic sections 106 through which light may be received to be converted into electricity. The supporting sections 108 extend above the light receiving surfaces 200 by a thickness dimension 202. The thickness dimension 202 represents the portion of the total thickness of the supporting sections 108 that extends above the photovoltaic sections 106. For example, the thickness dimension 202 may be the distance between the upper surface 118 of the supporting sections 108 and a plane defined by the light receiving surfaces 200 of the photovoltaic sections 106. Alternatively, the supporting sections 108 may not extend above the photovoltaic sections 106. For example, the supporting sections 108 may be approximately coplanar with the upper light receiving surfaces 200 of the photovoltaic sections 106.

The recesses 114, 116 extend into the supporting sections 108 from the upper surfaces 118 to internal lower surfaces 204 of the supporting sections 108. In the illustrated embodiment, the recesses 114, 116 extend inward from the upper surfaces 118 to a depth dimension 206 that is approximately the same or the same as the thickness dimension 202. For example, the lower surfaces 204 may be approximately coplanar with the light receiving surfaces 200 of the photovoltaic sections 106. Alternatively, the recesses 114, 116 may inwardly extend by a depth dimension 206 that differs from the thickness dimensions 202 of the supporting sections 108. For example, the lower surfaces 204 may not be coplanar with the light receiving surfaces 200 of the photovoltaic sections 106.

The connector assembly 100 may be mounted to the lower surfaces 204 in the recesses 114, 116 and extends upward from the lower surfaces 204 by a height dimension 208. As shown in FIG. 2, the height dimension 208 of the connector assembly 100 is no larger than the depth dimensions 206 of the recesses 114, 116. For example, the height dimension 208 may be approximately the same as or smaller that the depth dimensions 206. The height dimension 208 may be sufficiently small such that the connector assembly 100 is confined within the recesses 114, 116 and does not protrude above the upper surfaces 118 of the supporting sections 108. By confining the connector assembly 100 to the recesses 114, 116, additional solar shingles may be mounted to the upper surfaces 118 of the solar shingles 102, 104 above the connector assembly 100.

Figure 3:
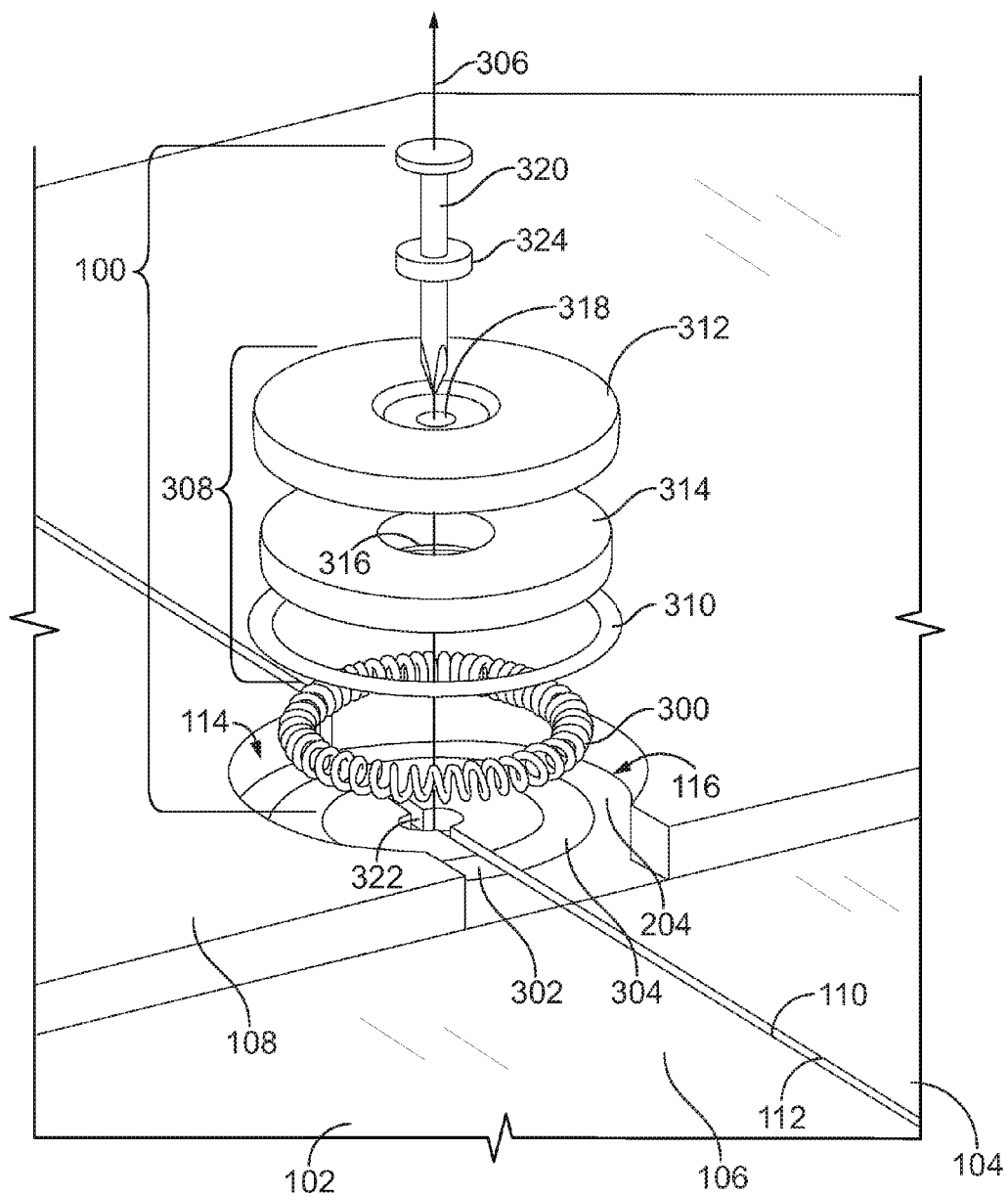
FIG. 3 is an exploded view of the connector assembly shown in FIG. 1 in accordance with one embodiment of the present disclosure.

FIG. 3 is an exploded view of the connector assembly 100 in accordance with one embodiment of the present disclosure. The connector assembly 100 in FIG. 3 is but one example of the different shapes in which the connector assembly 100 may be provided. For example, while the connector assembly 100 is shown as having a predominantly circular shape, the connector assembly 100 alternatively may have a different shape, such as the shape of a polygon or a linear shape.

The connector assembly 100 includes a contact 300 that engages the conductive members 302, 304 of the solar shingles 102, 104. While only one contact 300 is shown, alternatively the connector assembly 100 may include several contacts. In the illustrated embodiment, the conductive members 302, 304 are conductive pads formed in the internal lower surfaces 204 of the solar shingles 102, 104. The conductive members 302, 304 are shaped as semi-circles in FIG. 3, but alternatively may have different shapes. The contact 300 is a conductive body that simultaneously or concurrently engages the conductive members 302, 304 to electrically couple the photovoltaic sections 106 of the solar shingles 102, 104. The contact 300 may be in the shape of a circular or polygon ring that extends around a central axis 306 of the connector assembly 100. The contact 300 may be a resilient conductive body that is compressed against the conductive members 302, 304 to ensure an electrical coupling is provided between the contact 300 and the conductive members 302, 304. For example, the contact 300 may be a helical spring. Alternatively, the contact 300 may be a washer with an opening extending therethrough. In another embodiment, the contact 300 may be a helical spring or another conductive body that linearly extends between opposite ends. The above descriptions are merely examples of different conductive bodies that may be used as a contact 300. Other types of conductive bodies may be used instead.

In the illustrated embodiment, the contact 300 may be rotated to any position around the central axis 306 of the connector assembly 100 while still engaging both of the conductive members 302, 304. The ability to the contact 300 to engage both conductive members 302, 304 regardless of the position or rotation of the contact 300 around the central axis 306 may make it easier for the connector assembly 100 to be assembled on the roof of a structure.

The connector assembly 100 includes a protective cover 308 that is mounted above the contact 300 such that the contact 300 is disposed between the protective cover 308 and the conductive members 302, 304. In the illustrated embodiment, the protective cover 308 includes a housing 310, a cap 312, and a sealing body 314. The protective cover 308 is mounted to the lower surfaces 204 within the recesses 114, 116 to enclose the contact 300. The protective cover 308 protects the contact 300. For example, the protective cover 308 may prevent moisture and other contaminants from corroding or otherwise damaging the contact 300. The protective cover 308 may protect the contact 300 from mechanical damage caused by external bodies.

The housing 310 may be a dielectric body that encloses the contact 300 between the housing 310 and the lower surfaces 204 of the solar shingles 102, 104. For example, the housing 310 may include or be formed from one or more polymers. Alternatively, the housing 310 may be a conductive body, such as a body that includes or is formed from a metal or metal alloy. The housing 310 may be impact resistant to prevent mechanical damage to the contact 300 when the connector assembly 100 receives an impact from above the contact 300. The housing 310 includes an opening 316 that is aligned with the central axis 306.

The sealing body 314 is disposed between the housing 310 and the lower surfaces 204. The sealing body 314 may be a resilient body such as an elastomeric O-ring. The sealing body 314 seals an interface between the housing 310 and the lower surfaces 204 to restrict ingress of moisture and other contaminants into the space between the housing 310 and the lower surfaces 204 where the contact 300 is disposed.

The cap 312 is disposed above the housing 310 such that the housing 310 is located between the contact 300 and the cap 312. The cap 312 may be a conductive body, such as a body that includes or is formed from a metal or metal alloy. Alternatively, the cap 312 may include or be formed from one or more polymers. The cap 312 may be impact resistant to prevent mechanical damage to the housing 310 and contact 300 when the connector assembly 100 receives an impact from above the contact 300. The cap 312 includes an opening 318 that is aligned with the central axis 306.

While the protective cover 308 is shown as comprising both the housing 310 and the cap 312, alternatively the protective cover 308 may include additional or fewer components. For example, the protective cover 308 may be formed of a single body, such as the housing 310 or cap 312 only. As another example, the protective cover 308 may include additional bodies disposed above or within one or more of the housing 310 and cap 312.

In the illustrated embodiment, the connector assembly 100 is mounted to the solar shingles 102, 104 using a fastener 320. The fastener 320, such as a roofing nail or screw, is placed through the openings 318, 314 in the protective cover 308 along the central axis 306. The outer edges 110, 112 of the solar shingles 102, 104 may include cut-outs that form an opening 322. The opening 322 extends through the supporting sections 108 within the recesses 114, 116 to provide a passage for the fastener 320 to extend through the solar shingles 102, 104. The fastener 320 may be placed through the openings 316, 318 in the connector assembly 100 and the opening 322 in the solar shingles 102, 104 to be affixed to a body disposed below the solar shingles 102, 104. For example, the fastener 320 may extend through the connector assembly 100 and the solar shingles 102, 104 to a roof or other component of a structure or dwelling, or to the supporting section 108 of another solar shingle disposed below the solar shingles 102, 104. In another embodiment, one or more of the openings 316, 318, 322 may not be provided such that the fastener 320 cuts through one or more of the protective cover 308 and the supporting sections 108. The fastener 320 extends into the roof, structure, or solar shingles below the solar shingles 102, 104 to secure the solar shingles 102, 104 thereto. Alternatively, the connector assembly 100 may be secured to the solar shingles 102, 104 using another structure, such as an adhesive, solder, or another mechanical fastener.

A sealing body 324 may extend around the fastener 320. The sealing body 324 may be a resilient body such as an elastomeric O-ring. The sealing body 324 seals an interface between the fastener 320 and the protective cover 308 at the opening 318. The sealing body 324 may restrict ingress of moisture and other contaminants into the protective cover 308 through the opening 318.

Figure 4:
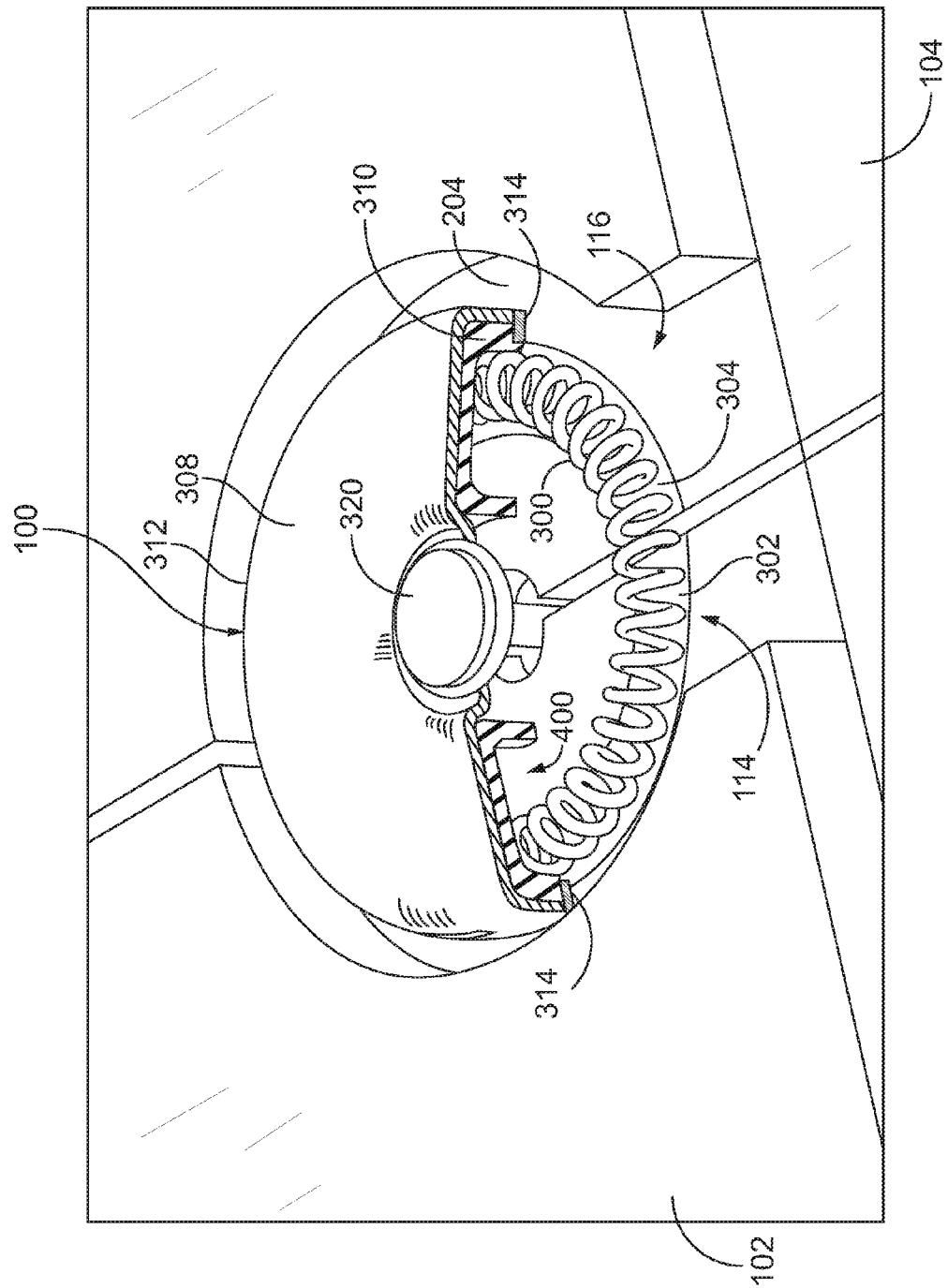
FIG. 4 is a cross-sectional view of the connector assembly shown in FIG. 1 in accordance with one embodiment of the present disclosure.

FIG. 4 is a cross-sectional view of the connector assembly 100 mounted to the solar shingles 102, 104 in accordance with one embodiment of the present disclosure. As shown in FIG. 4, the fastener 320 secures the connector assembly 100 to the solar shingles 102, 104 within the recesses 114, 116. The protective cover 308 encloses the contact 300 between the protective cover 308 and the internal lower surfaces 204 of the solar shingles 102, 104. For example, the protective cover 308 may form a donut-shaped channel 400 extending around the fastener 320. The contact 300 is disposed in the channel 400 and may be enclosed within the channel 400 such that the contact 300 is protected from external moisture and contaminants.

The fastener 320 may compress the cap 312 against the housing 310, which compresses the contact 300 against the conductive members 302, 304 within the channel 400. The contact 300 may be compressed against the conductive members 302, 304 to ensure that the connector assembly 100 electrically couples the conductive members 302, 304 with one another. As shown in FIG. 4, the contact 300 may encircle the fastener 320.

Figure 5:
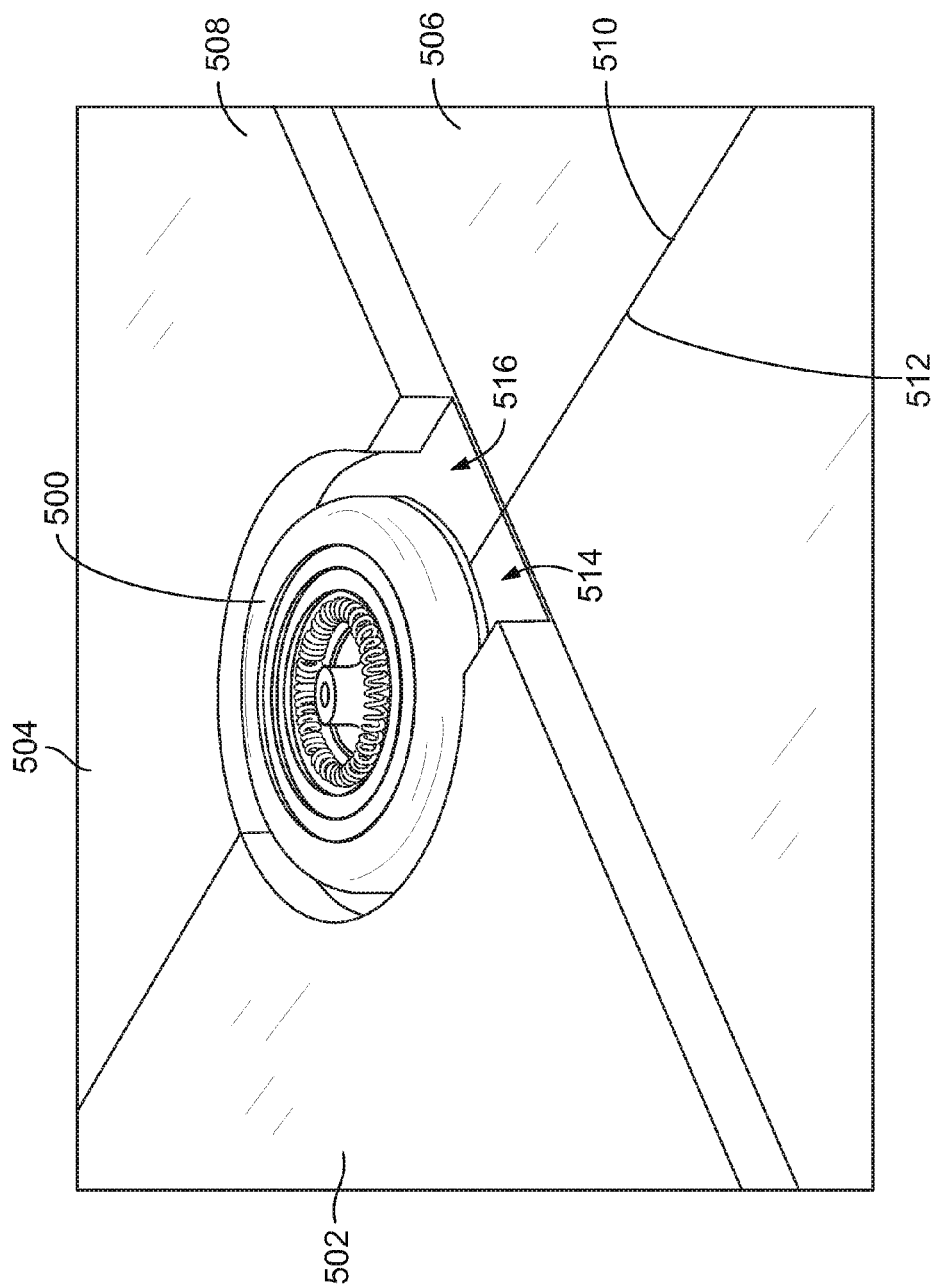
FIG. 5 is a perspective view of a connector assembly for electrically coupling lower solar shingles with an upper solar shingle in accordance with one embodiment of the present disclosure.

FIG. 5 is a perspective view of a connector assembly 500 for electrically coupling lower solar shingles 502, 504 with an upper solar shingle 800 (shown in FIG. 8) in accordance with one embodiment of the present disclosure. The solar shingles 502, 504, 800 may be similar to the solar shingles 102, 104 (shown in FIG. 1). The solar shingles 502, 504, 800 include photovoltaic sections 506 and supporting sections 508, similar to the photovoltaic sections 106 (shown in FIG. 1) and the supporting sections 108 (shown in FIG. 1). The supporting sections 508 of the solar shingles 502, 504 provide a surface upon which the solar shingle 800 is mounted. The connector assembly 500 electrically couples the horizontally adjacent solar shingles 502, 504 with the vertically adjacent shingle 800. For example, the connector assembly 500 couples the solar shingles 502, 504 with the solar shingle 800 located above the solar shingles 502, 504.

The solar shingles 502, 504 abut one another along outer edges 510, 512 of the solar shingles 502, 504. Alternatively, a gap may exist between the outer edges 510, 512. In the illustrated embodiment, the supporting sections 508 include recesses 514, 516 that are similar to the recesses 114, 116 (shown in FIG. 1). The connector assembly 500 is disposed in the recesses 514, 516 similar to the connector assembly 100 to electrically join the solar shingles 502, 504.

Figure 6:
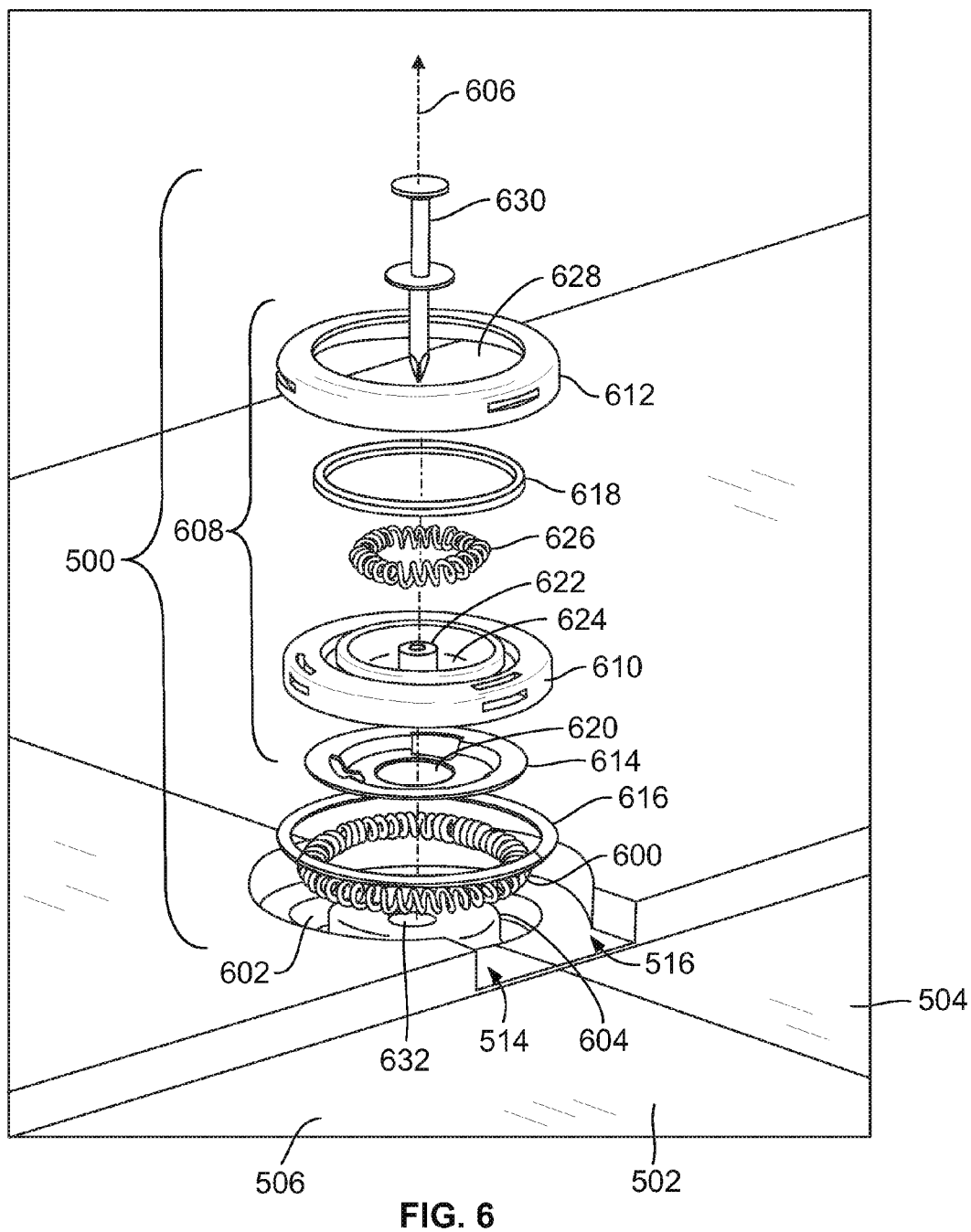
FIG. 6 is an exploded view of the connector assembly shown in FIG. 5 in accordance with one embodiment of the present disclosure.

FIG. 6 is an exploded view of the connector assembly 500 in accordance with one embodiment of the present disclosure. The connector assembly 500 in FIG. 6 is but one example of the different shapes in which the connector assembly 500 may be provided. For example, while the connector assembly 500 is shown as having a predominantly circular shape, the connector assembly 500 alternatively may have a different shape, such as the shape of a polygon or a linear shape.

The connector assembly 500 includes a lower contact 600 that engages conductive members 602, 604 of the solar shingles 502, 504. While only one lower contact 600 is shown, alternatively the connector assembly 500 may include several lower contacts 600. The lower contact 600 is a conductive body that simultaneously or concurrently engages the conductive members 602, 604 to electrically couple the photovoltaic sections 506 of the solar shingles 502, 504. The lower contact 600 may be in the shape of a circular or polygon ring that extends around a central axis 606 of the connector assembly 500. The lower contact 600 may be a resilient conductive body that is compressed against the conductive members 602, 604 to ensure an electrical coupling is provided between the lower contact 600 and the conductive members 602, 604. For example, the lower contact 600 may be a helical spring. Alternatively, the lower contact 600 may be a washer with an opening extending therethrough. In another embodiment, the lower contact 600 may be a helical spring or another conductive body that linearly extends between opposite ends. The above descriptions are merely examples of different conductive bodies that may be used as the lower contact 600. Other types of conductive bodies may be used instead.

The connector assembly 500 includes a protective cover 608 that is mounted above the lower contact 600 such that the lower contact 600 is disposed between the protective cover 608 and the conductive members 602, 604. In the illustrated embodiment, the protective cover 608 includes a housing 610, a cap 612, a conductive plate 614, and two sealing bodies 616, 618. The protective cover 608 is mounted to the solar shingles 502, 504 within the recesses 514, 516 to enclose the lower contact 600. The protective cover 608 protects the lower contact 600. For example, the protective cover 608 may prevent moisture and other contaminants from corroding or otherwise damaging the lower contact 600. The protective cover 608 may protect the lower contact 600 from mechanical damage caused by external bodies.

The housing 610 may be a dielectric body that encloses the lower contact 600 between the housing 610 and the solar shingles 502, 504. For example, the housing 610 may include or be formed from one or more polymers. Alternatively, the housing 610 may be a conductive body, such as a body that includes or is formed from a metal or metal alloy. The housing 610 may be impact resistant to prevent mechanical damage to the lower contact 600. In the illustrated embodiment, the housing 610 includes a center opening 622 and a ring opening 624 extending therethrough. The ring opening 624 encircles the center opening 622.

The conductive plate 614 is formed as a conductive body having a center opening 620 extending therethrough. The conductive plate 614 may be stamped and formed from a common sheet of conductive material, such as a metal or metal alloy. The conductive plate 614 is placed between the lower contact 600 and the housing 610 such that the housing 610 holds the conductive plate 614 against the lower contact 600 and the lower contact 600 and conductive plate 614 are electrically coupled. A portion of the conductive member 614 is located at or near the ring opening 624 in the housing 610 such that the conductive plate 614 is accessible through the ring opening 624.

The lower sealing body 616 is disposed between the housing 610 and the solar shingles 502, 504. The lower sealing body 616 may be a resilient body such as an elastomeric O-ring. The lower sealing body 616 seals an interface between the housing 610 and the solar shingles 502, 504 to restrict ingress of moisture and other contaminants into the space between the housing 610 and the solar shingles 502, 504 where the lower contact 600 is disposed.

An upper contact 626 is received in the housing 610 from an opposite side that the lower contact 600 is received. For example, the lower and upper contacts 600, 626 are located on opposite sides of the housing 610. The upper contact 626 may be similar to the lower contact 600. For example, the upper contact 626 may be in the shape of a circular or polygon ring that extends around the central axis 606. The upper contact 626 may be a resilient conductive body that engages the conductive plate 614 through the ring opening 624 in the housing 610. The upper contact 626 may abut the conductive plate 614 through the ring opening 624 such that the upper and lower contacts 626, 600 are electrically coupled by the conductive plate 614.

The cap 612 is disposed above the housing 610 such that the housing 610 is located between the lower contact 600 and the cap 612. The cap 612 may be a conductive body, such as a body that includes or is formed from a metal or metal alloy. Alternatively, the cap 612 may include or be formed from one or more polymers. In the illustrated embodiment, the cap 612 is formed as a ring that encircles the center axis 606. An opening 628 extends through the cap 612. The cap 612 engages the solar shingle 800 (shown in FIG. 8) when the solar shingle 800 is mounted to the solar shingles 502, 504. The opening 628 in the cap 612 permits the upper contact 626 to engage a conductive member 802 (shown in FIG. 8) of the solar shingle 800 in order to electrically couple the solar shingle 800 with the solar shingles 502, 504.

The upper sealing body 618 is disposed between the housing 610 and the cap 612. The upper sealing body 618 may be a resilient body such as an elastomeric O-ring. The upper sealing body 618 seals an interface between the housing 610 and the cap 612 to restrict ingress of moisture and other contaminants into the space between the housing 610 and the cap 612 where the upper contact 626 is disposed.

In the illustrated embodiment, the connector assembly 500 is mounted to the solar shingles 502, 504 using a fastener 630. The fastener 630, such as a roofing nail or screw, is placed through the openings 628, 622, 620 in the protective cover 608 and through the contacts 600, 626 along the central axis 606. The solar shingles 502, 504 may include cut-outs that form an opening 632. The opening 632 provides a passage for the fastener 630 to extend through the solar shingles 502, 504. The fastener 630 may be affixed to a body disposed below the solar shingles 502, 504. For example, the fastener 630 may extend through the connector assembly 500 and the solar shingles 502, 504 to a roof or other component of a structure or dwelling, or to another solar shingle disposed below the solar shingles 502, 504.

Figure 7:
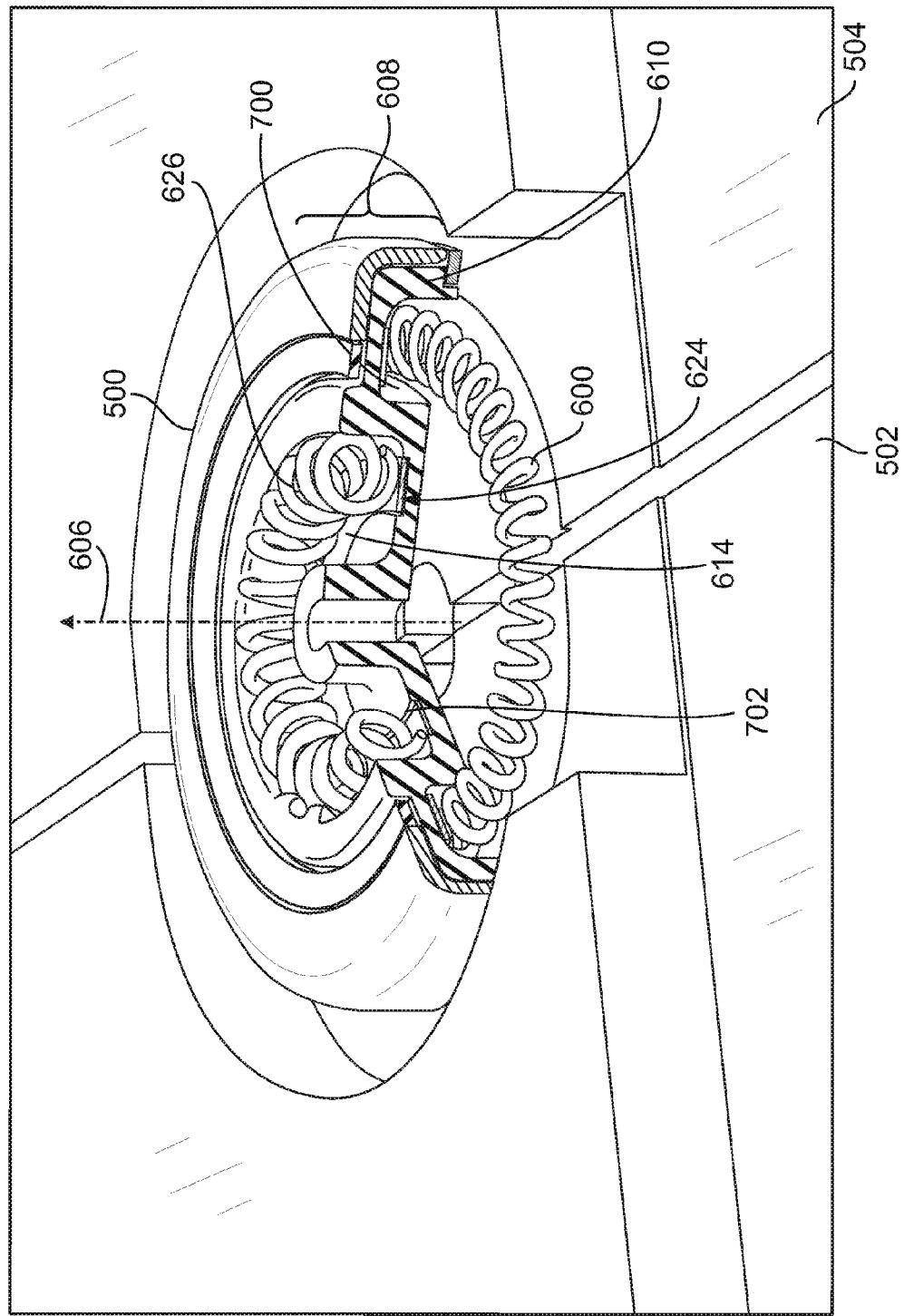
FIG. 7 is a cross-sectional view of the connector assembly shown in FIG. 5 mounted to the solar shingles shown in FIG. 5 in accordance with one embodiment.

FIG. 7 is a cross-sectional view of the connector assembly 500 mounted to the solar shingles 502, 504 in accordance with one embodiment. The protective cover 608 encloses the lower contact 600 between the protective cover 608 and the solar shingles 502, 504. The protective cover 608 forms a donut-shaped lower channel 700 extending around the central axis 606. The lower contact 600 is disposed in the lower channel 700 and may be enclosed within the lower channel 700 such that the contact 600 is protected from external moisture and contaminants. The housing 610 forms an upper channel 702 that extends around the central axis 606. The upper contact 626 is disposed in the upper channel 702. The conductive plate 614 engages the upper contact 626 through the ring opening 624 in the upper channel 702. As shown in FIG. 7, the conductive plate 614 also is disposed along the lower side of the housing 610 within the lower channel 700. The conductive plate 614 engages the lower contact 600 within the lower channel 700. As a result, the conductive plate 614 engages both the lower and upper contacts 600, 626 at the same time to electrically join the lower and upper contacts 600, 626 with each other.

Figure 8:
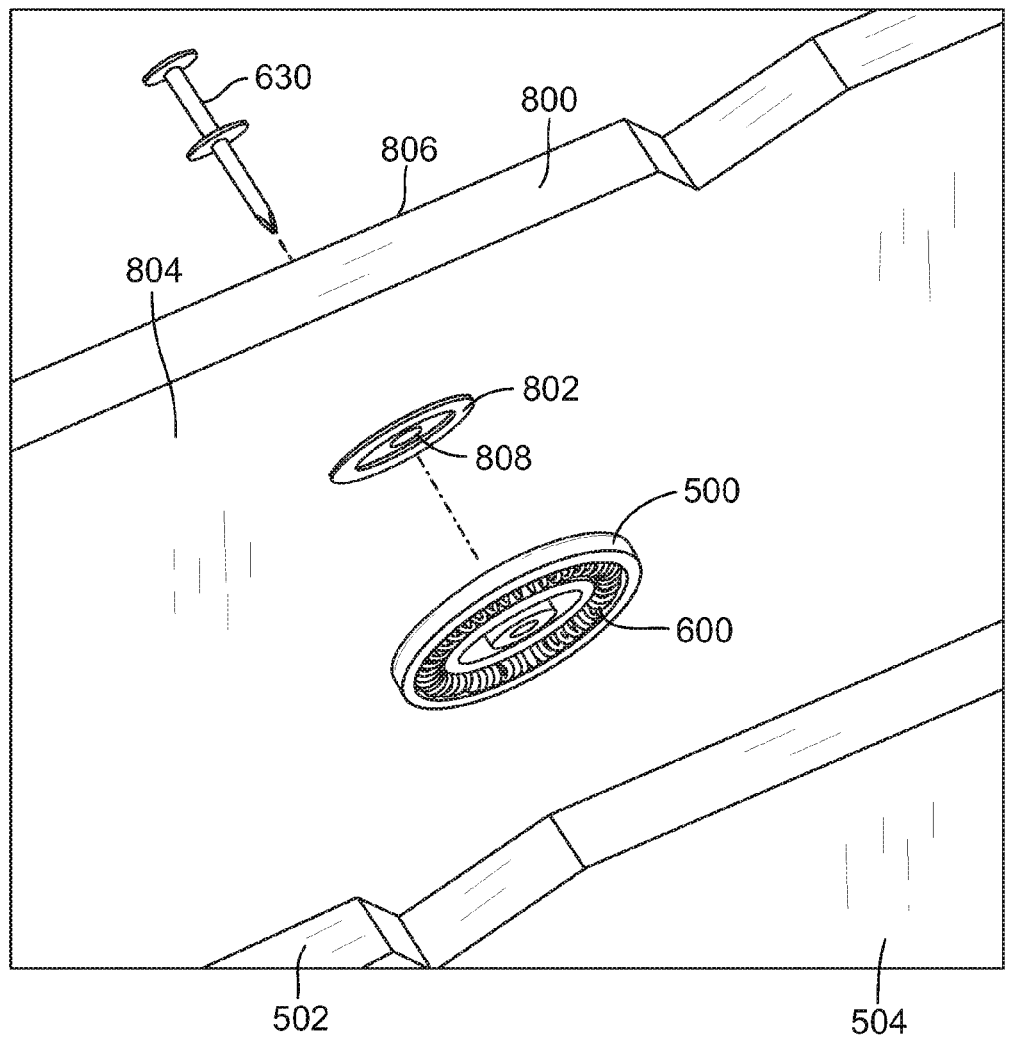
FIG. 8 is an exploded view of the connector assembly shown in FIG. 5 between the solar shingles shown in FIG. 5 and an upper solar shingle in accordance with one embodiment.

FIG. 8 is an exploded view of the connector assembly 500 between the solar shingles 502, 504 and the solar shingle 800 in accordance with one embodiment. As shown in FIG. 8, the solar shingle 800 includes the conductive member 802 located on a bottom side 804 of the solar shingle 800. The conductive member 802 may be electrically joined with a photovoltaic section 806 of the solar shingle 800, similar to the conductive members 302, 304 (shown in FIG. 3) being joined with the photovoltaic sections 106 (shown in FIG. 1). The connector assembly 500 is disposed between the solar shingle 800 and the solar shingles 502, 504 such that the upper contact 626 (shown in FIG. 6) engages the conductive member 802 of the solar shingle 800 and the lower contact 600 engages the conductive members 602, 604 (shown in FIG. 6) of the solar shingles 502, 504. The solar shingle 800 includes an opening 808 through which the fastener 630 extends. The fastener 630 secures the solar shingle 800 to the solar shingles 502, 504 with the connector assembly 500 engaging the conductive members 802, 602, 604. The connector assembly 500 simultaneously couples the solar shingles 502, 504, 800 with one another by horizontally coupling the solar shingles 502, 504 while vertically coupling the solar shingles 502, 504 with the solar shingle 800.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly for electrically coupling solar shingles, the solar shingles comprising photovoltaic sections that convert light into electricity and supporting sections having upper surfaces to which additional solar shingles are mounted, the connector assembly comprising:
   a contact configured to electrically couple the photovoltaic sections of adjacent solar shingles by engaging conductive members disposed in recesses of the supporting sections of the solar shingles; and
   a protective cover configured to be disposed in the recesses of the solar shingles, the protective cover enclosing the contact between the protective cover and the conductive members.

2. The connector assembly of claim 1, wherein the contact and the protective cover extend above the conductive members to a height dimension that is no greater than a depth dimension that the recesses extend below the upper surfaces.

3. The connector assembly of claim 1, wherein the contact and the protective cover are configured to be disposed in the recesses such that the additional solar shingles are mounted to the supporting sections and above the contact and the protective cover.

4. The connector assembly of claim 1, wherein the contact and the protective cover are confined to the recesses between lower surfaces of the supporting sections within the recesses and the additional solar shingles when the additional solar shingles are mounted to the supporting sections.

5. The connector assembly of claim 1, wherein the contact and the protective member do not project above the upper surfaces of the supporting sections of the adjacent solar shingles.

6. The connector assembly of claim 1, wherein the contact comprises a resilient conductive body that is configured to be compressed between the protective cover and the conductive members when the protective cover is mounted to the supporting sections of the solar shingles.

7. The connector assembly of claim 1, wherein the contact comprises a conductive ring that concurrently engages the conductive members of the adjacent solar shingles.

8. The connector assembly of claim 1, wherein the contact is configured to extend across an interface between outer edges of the adjacent solar shingles while electrically coupling the conductive members of the adjacent solar shingles.

9. The connector assembly of claim 1, wherein the protective cover includes an opening configured to receive a fastener therethrough to secure the protective cover to the supporting portions of the adjacent solar shingles.

10. The connector assembly of claim 1, wherein the protective cover comprises a housing and a cap, the housing defining a channel with the contact disposed therein, the housing located between the cap and the contact when the protective cover is mounted to the adjacent solar shingles.

11. The connector assembly of claim 1, wherein the contact is a lower contact, further comprising an upper contact, the upper contact engaging a conductive member of at least one of the additional solar shingles and electrically coupling the solar shingles with the at least one of the additional solar shingles.

12. The connector assembly of claim 11, wherein the lower and upper contacts are electrically joined with one another.

13. A connector assembly for electrically coupling solar shingles that convert light into electricity, the solar shingles having recesses extending inward from upper surfaces to lower surfaces of the solar shingles and disposed along outer edges of the solar shingles with conductive members disposed in the recesses, the connector assembly comprising:

a contact configured to be disposed in the recesses such that the contact overlaps an interface between the outer edges of the solar shingles and engages the conductive members to electrically couple the solar shingles; and a protective member configured to be mounted to the solar shingles in the recesses, the protective cover enclosing the contact between the protective cover and the conductive members.

14. The connector assembly of claim 13, wherein the protective cover extends from the lower surfaces in the recesses to a height dimension that is no greater than thickness dimensions of the solar shingles between the lower surfaces and the upper surfaces.

15. The connector assembly of claim 14, wherein the height dimension to which the protective member extends above the lower surfaces is small enough to prevent the protective member from protruding above the upper surfaces of the solar shingles.

16. The connector assembly of claim 13, wherein the contact comprises a conductive ring that concurrently engages the conductive members of the solar shingles.

17. A connector assembly for electrically coupling photovoltaic sections of adjacent lower solar shingles with a photovoltaic section of an upper solar shingle, the connector assembly comprising:

a lower contact configured to electrically couple the photovoltaic sections of the lower solar shingles by engaging conductive members of the lower solar shingles;

an upper contact configured to engage a conductive member of the upper solar shingle; and a protective cover disposed between the lower contact and the upper contact, the protective cover including an opening through which the lower contact and the upper contact are electrically joined with each other, wherein the lower contact and the upper contact simultaneously couple the photovoltaic sections of the lower solar shingles with the photovoltaic section of the upper solar shingle.

18. The connector assembly of claim 17, wherein the protective cover includes a housing having upper and lower channels, the upper channel receiving the upper contact, the lower channel receiving the lower contact.

19. The connector assembly of claim 17, wherein the protective cover includes a housing and a conductive plate, the conductive plate disposed between the lower contact and the housing, the housing disposed between the upper contact and the conductive plate, wherein the conductive plate engages the lower contact and engages the upper contact through the opening.

20. The connector assembly of claim 17, wherein the upper and lower contacts are helical springs.

* * * * *